United States Patent
Dahlhaus-Preussler et al.

(10) Patent No.: US 11,131,386 B2
(45) Date of Patent: Sep. 28, 2021

(54) SEAL (71) Applicant: Carl Freudenberg KG, Weinheim (DE)

(72) Inventors: Ulrich Dahlhaus-Preussler, Edingen-Neckarhausen (DE); Daniel Froehlich, Weinheim (DE); Ludwig Baer, Moerlenbach (DE); Pit Wiedemann, Magdeburg (DE); Christian Pfeifer, Bernburg (DE)

(73) Assignee: CARL FREUDENBERG KG, Weinheim (DE)

( * ) Notice: Subject to any disclaimer, the term of this patent is extended or adjusted under 35 U.S.C. 154(b) by 241 days.

(21) Appl. No.: 15/961,887

(22) Filed: Apr. 25, 2018

(65) Prior Publication Data
US 2018/0313449 A1 Nov. 1, 2018

(30) Foreign Application Priority Data

Apr. 27, 2017 (DE) ..................... 10 2017 004 061.3

(51) Int. Cl.
*F16J 15/3284* (2016.01)
*F16J 15/322* (2016.01)
(Continued)

(52) U.S. Cl.
CPC ......... *F16J 15/3284* (2013.01); *F16J 15/322* (2013.01); *F16J 15/3228* (2013.01); *F16J 15/3232* (2013.01); *F16J 15/3268* (2013.01)

(58) Field of Classification Search
CPC .. F16J 15/3204; F16J 15/3208; F16J 15/3212; F16J 15/3236; F16J 15/3264;
(Continued)

(56) References Cited

U.S. PATENT DOCUMENTS 3,467,395 A * 9/1969 Kan ..................... F16J 15/3268
277/551
4,550,920 A * 11/1985 Matsushima ........ F16J 15/3244
277/559
(Continued)

FOREIGN PATENT DOCUMENTS

CN 2675968 Y 2/2005
CN 2818933 Y 9/2006
(Continued)

*Primary Examiner* — Kristina R Fulton
*Assistant Examiner* — L. Susmitha Koneru
(74) *Attorney, Agent, or Firm* — Leydig, Voit & Mayer, Ltd.

(57) ABSTRACT

A seal includes a supporting ring and at least one sealing ring. The at least one sealing ring has a sheath. The at least one sealing ring and the supporting ring are interconnected. The supporting ring has an outer periphery and is, at least in part, surrounded on the outer periphery by the sheath of the at least one sealing ring in a radial direction. The at least one sealing ring has at least one dynamically loaded sealing lip, which is arranged on a side of the at least one sealing ring facing radially away from the sheath. The at least one sealing ring includes an electrically conductive polymer material. The sheath and the sealing lip transition into one another as one piece.

14 Claims, 4 Drawing Sheets

(51) Int. Cl.
*F16J 15/3268* (2016.01)
*F16J 15/3228* (2016.01)
*F16J 15/3232* (2016.01)

(58) Field of Classification Search
CPC .... F16J 15/3284; F16J 15/322; F16J 15/3228; F16J 15/3268
USPC .......................................... 277/571
See application file for complete search history.

(56) References Cited

U.S. PATENT DOCUMENTS

| | | | | |
|---|---|---|---|---|
| 4,643,436 | A * | 2/1987 | Jackowski | F16J 15/3264 |
| | | | | 277/569 |
| 4,645,362 | A * | 2/1987 | Orte | F16C 33/80 |
| | | | | 384/485 |
| 6,513,810 | B1 | 2/2003 | Pataille | |
| 6,666,459 | B1 * | 12/2003 | Hufnagel | F16J 15/3232 |
| | | | | 277/572 |
| 6,688,603 | B2 * | 2/2004 | vom Schemm | F16J 15/3216 |
| | | | | 277/549 |
| 6,692,007 | B2 * | 2/2004 | Oldenburg | F16J 15/324 |
| | | | | 277/353 |
| 6,860,486 | B2 * | 3/2005 | Hacker | A61B 5/7475 |
| | | | | 277/549 |
| 8,590,903 | B2 * | 11/2013 | Berdichevsky | F16J 15/322 |
| | | | | 277/551 |
| 9,689,496 | B2 * | 6/2017 | Wilkins | F16J 15/3224 |
| 9,845,882 | B2 * | 12/2017 | Lutaud | F16J 15/002 |
| 9,851,010 | B2 * | 12/2017 | Humblot | F16J 15/3204 |
| 10,161,522 | B2 | 12/2018 | Colineau et al. | |
| 10,352,451 | B2 * | 7/2019 | Kamiya | F16J 15/3208 |
| 2001/0051237 | A1 * | 12/2001 | Gust | C09K 3/1009 |
| | | | | 428/34.1 |
| 2003/0031828 | A1 * | 2/2003 | Kosty | F16J 15/3228 |
| | | | | 428/122 |
| 2004/0232620 | A1 * | 11/2004 | Bock | G01M 3/045 |
| | | | | 277/320 |
| 2004/0245729 | A1 * | 12/2004 | Bock | F16J 15/3496 |
| | | | | 277/569 |
| 2007/0063452 | A1 | 3/2007 | Kurth | |
| 2011/0308692 | A1 | 12/2011 | Hintenlang et al. | |
| 2012/0112419 | A1 | 5/2012 | Franz | |
| 2013/0200575 | A1 * | 8/2013 | Humblot | F16J 15/3228 |
| | | | | 277/549 |
| 2014/0097572 | A1 * | 4/2014 | Hatch | F16J 15/3232 |
| | | | | 277/353 |
| 2014/0203514 | A1 * | 7/2014 | Colineau | F16J 15/3232 |
| | | | | 277/353 |
| 2016/0010750 | A1 * | 1/2016 | Colineau | F16J 15/322 |
| | | | | 277/565 |

FOREIGN PATENT DOCUMENTS

| | | |
|---|---|---|
| DE | 10293217 T5 | 4/2004 |
| DE | 10340802 A1 | 4/2005 |
| DE | 102006059398 A1 | 6/2008 |
| DE | 102013001172 A1 | 8/2013 |
| DE | 102014010269 A1 | 1/2016 |
| EP | 2280201 A1 | 2/2011 |
| EP | 2397726 A1 | 12/2011 |
| JP | 2000320689 A | 11/2000 |
| JP | 2004308905 A | 5/2006 |
| JP | 2007064486 A | 3/2007 |
| JP | 2010048284 A | 3/2010 |
| JP | 2013500441 A | 1/2013 |
| JP | 2014142065 A | 8/2014 |

* cited by examiner

SEAL

CROSS-REFERENCE TO PRIOR APPLICATION

Priority is claimed to German Patent Application No. DE 10 2017 004 061.3, filed on Apr. 27, 2017, the entire disclosure of which is hereby incorporated by reference herein.

FIELD

The invention relates to a seal, comprising a supporting ring and at least one sealing ring, the sealing ring and the supporting ring being interconnected, the supporting ring comprising an outer periphery and being, at least in part, surrounded on the outer periphery by a sheath of the sealing ring in the radial direction, the sealing ring comprising at least one dynamically loaded sealing lip, which is arranged on the side of the sealing ring facing radially away from the sheath.

BACKGROUND

A seal of this kind is known from DE 10 2014 010 269 A1.

The supporting ring consists of a tough and hard material, for example a metal or polymer material. The sealing ring is directly or indirectly connected to the supporting ring, the sealing ring consisting of an elastomer material.

Furthermore, the previously known seal comprises a substantially annular disk made of an electrically conductive and air-permeable material, the disk being designed as an individual part produced separately from the supporting ring and being connected to the supporting ring. The disk consists of an electrically conductive nonwoven and is designed as a preliminary seal.

The preliminary seal is associated with the sealing lip of the sealing ring adjacently thereto at an axial spacing. When used as intended, the preliminary seal is arranged on the side of sealing lip facing the surroundings.

The preliminary seal has the function of preventing impurities from the surroundings from penetrating the sealing lip. As a result, consistently effective use-related properties of the seal are achieved over a long service life.

A further seal is known from DE 103 40 802 A1. The sealing ring of said seal consists of an electrically conductive elastomer material. The seal is used to seal components comprising toothed parts, charge separations occurring when said toothed parts move. The resultant currents are discharged in part by the medium to be sealed, i.e. the used lubricant, and currents are in part transferred to the components to be sealed with respect to one another. The advantage of the electrically conductive elastomer material is that currents can be easily discharged through the sealing ring.

In one of the previously known embodiments, the dynamically loaded sealing lip is associated, on the side facing axially away from the chamber to be sealed, with a dust lip, which is formed in one piece with the sealing lip, is made of the same material as said sealing lip, and therefore also consists of an electrically conductive elastomer material.

However, it should be noted that, when used as intended, elastomer materials always have to be sufficiently lubricated in order to achieve a satisfactory service life, the medium to be sealed usually providing the lubrication. If, when the seal is used as intended, the lubrication is insufficient, the elastomer material of the sealing ring wears quickly, and the use-related properties of the seal worsen after just a short service life.

SUMMARY

In an embodiment, the present invention provides a seal, comprising: a supporting ring; and at least one sealing ring, the at least one sealing ring having a sheath, the at least one sealing ring and the supporting ring being interconnected, wherein the supporting ring comprises an outer periphery and is, at least in part, surrounded on the outer periphery by the sheath of the at least one sealing ring in a radial direction, the at least one sealing ring comprising at least one dynamically loaded sealing lip, which is arranged on a side of the at least one sealing ring facing radially away from the sheath, wherein the at least one sealing ring is comprised of an electrically conductive polymer material, and wherein the sheath and the sealing lip transition into one another as one piece.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In order for the object to be achieved, the sealing ring consists of an electrically conductive polymer material, and the sheath and the sealing lip are formed so as to transition into one another as one piece.

Polymers materials—in contrast with elastomer materials—are advantageous in that they have largely consistently effective use-related properties over a long service life, even if said polymer materials are only insufficiently lubricated. For this reason, the dynamically loaded sealing lip can be easily arranged on the side of a main sealing lip facing the surroundings, as a practically non-lubricated preliminary seal.

In contrast with an electrically conductive nonwoven, an electrically conductive polymer material is advantageous in that the contact pressure of the sealing lip on a surface to be sealed of a machine element to be sealed is practically constant for the whole of the service life.

Also in contrast with a sealing lip that consists of an electrically conductive nonwoven, a sealing lip made of a polymer material withstands dry running just as effectively, a polymer material does not absorb any moisture and can also, over a long service life, reliably seal machine elements which are to be sealed and are operated at high speeds, for example at more than 20,000 $min^{-1}$. Furthermore, in comparison with sealing rings made of a nonwoven, sealing rings made of a polymer material are advantageous in that they can more effectively compensate for any displacement of a shaft to be sealed.

As a result of the electrically conductive polymer material of the sealing ring, an uncoupled electrical bridge forms between the machine elements to be sealed with respect to one another. Said machine elements to be sealed with respect to one another may be formed, for example, by a shaft to be sealed having a surface to be sealed, and a housing which surrounds the shaft to be sealed on the outer periphery thereof at a radial spacing, the seal being arranged in the gap formed by the spacing.

According to an advantageous embodiment, the electrically conductive polymer material may be a PTFE material. A material of this kind in particular has the above-described advantages because sealing lips consisting of said material have practically self-lubricating properties. Therefore, a sealing lip made of a material of this kind practically does not wear at all even after a long service life and therefore largely maintains the same use-related properties.

The sheath and the sealing lip are preferably formed of the same material. This is advantageous in that a seal of this kind is easy and cheap to manufacture.

If, as a result of the particular circumstances of the application, it is advantageous to produce the sheath and the sealing lip from different materials, these two different polymer materials are both electrically conductive such that it is possible to discharge electrostatic charge from the sealing arrangement comprised by the seal.

According to an advantageous embodiment, the supporting ring may be substantially L-shaped and has a radial leg and an axial leg which adjoins the radial leg externally in the radial direction.

The supporting ring may generally consist of a metal or polymer material.

The advantageous use-related properties of the seal do not require the supporting ring to be electrically conductive, because electrical voltage puncture is prevented by the sealing ring consisting, from the sealing lip to the sheath, of an electrically conductive polymer.

Radially internally with respect to the radial leg, the dynamically loaded sealing lip is usually articulated. By contrast, the sheath is radially externally supported by the axial leg.

The axial leg may be completely surrounded by the sheath on the outer periphery. In this respect, it is advantageous that the electrical conductivity of the seal functions particularly reliably as a result of the sheath being well supported by the axial leg.

The sheath extends, along the radial leg in the radial direction, so as to transition into the dynamically loaded sealing lip as one piece. As a result, a simple electrically conductive connection is established between the machine elements to be sealed with respect to one another, for example between a shaft to be sealed and a housing which surrounds the periphery of the shaft to be sealed.

The electrically conductive sealing ring brings about controlled electric potential equalization between the machine elements to be sealed with respect to one another.

This therefore eliminates mechanical damage to the machine elements as a result of electrostatic charge in one of the machine elements and subsequent voltage puncture towards the other machine element having a different electric potential.

In the sealing arrangement in which the above-described sealing ring is used, one of the machine elements to be sealed with respect to one another is earthed to a defined ground potential (for example, the body of a motor vehicle as an electrical ground potential) such that potential equalization with respect to the other machine element is achieved by the electrically conductive sealing ring.

According to a first embodiment, the dynamically loaded sealing lip may be formed as a main sealing lip for sealing a medium to be sealed in a chamber to be sealed. For this purpose, when the seal is used as intended, the dynamically loaded sealing lip is generally axially curved towards the chamber to be sealed.

On the side of the sealing lip radially facing the machine element to be sealed, said sealing lip may, for example, have a surface profiling, it being possible for the surface profiling to have lubricant pockets and/or a backflow twist, for example.

According to another embodiment, the dynamically loaded sealing lip may be formed as a preliminary sealing lip.

A preliminary sealing lip is an uncoupled electrical bridge. In this context, "uncoupled" is understood to mean that the sealing function of a used main sealing lip is uncoupled from the function of an electrical bridge formed by the preliminary sealing lip. The preliminary sealing lip is not in direct contact with the medium to be sealed. It is advantageous that the electrical resistance of the preliminary sealing lip remains substantially constant over the whole of the service life. If the preliminary sealing lip were to come into contact with the medium to be sealed, the resistance would change constantly and uncontrollably when the seal is used as intended.

If the above-claimed sealing lip is formed as a preliminary sealing lip, a further dynamically loaded sealing lip, as a main sealing lip for sealing a medium to be sealed in a chamber to be sealed, is arranged upstream of said preliminary sealing lip in the axial direction in a functional series arrangement. The material of which a further sealing lip of this kind consists may be suited to the particular use-related circumstances. It is not necessary for the further sealing lip to also be electrically conductive.

The further dynamically loaded sealing lip may consist of a polymer or elastomer material. If a polymer material is used, for example a PTFE material, it is possible to dispense with separately produced spring elements, for example annular spiral coiled springs, which press the further sealing lip against the machine element to be sealed so as to be resiliently radially prestressed.

By contrast, if an elastomer material is used, the sealing lip made of said material may be radially surrounded on the outer periphery by a spring element, for example an annular spiral coiled spring. In particular in the case of a stationary shaft to be sealed and/or only low relative overpressure in the chamber to be sealed, the spring element ensures effective sealing by the further sealing lip on the surface to be sealed of the machine element to be sealed.

The supporting ring may consist of a metal material. Supporting rings of this kind are easy and cheap to produce in many dimensions.

The sealing ring may be in direct abutting contact with the supporting ring.

According to another embodiment, the sealing ring may be in indirect abutting contact with the supporting ring by means of an elastomer track.

The elastomer track may completely surround the axial leg and/or the radial leg. This is advantageous in that the supporting ring is thus particularly well protected from external influences, for example from exposure to moisture.

Without electric potential equalization, as is brought about by the above-described seal, the machine elements to be sealed with respect to one another could be mechanically damaged as a result of voltage puncture. As a result of the potential equalization, varying amounts of electric potential in the machine elements are equalized.

Generally, the closer the machine elements having varying electric potentials are adjacently associated with one other, the greater the likelihood of voltage puncture. Voltage puncture of this kind may cause removal of material from the machine element having a relatively lower charge and an undesirable change to the microstructure of the material in the region of the voltage puncture.

The first machine element may be formed by a drive shaft of an electric motor, and the second machine element may be formed by a housing of a gearbox that is connected to the electric motor and surrounds the drive shaft.

This specific use of the above-described seal is particularly advantageous. If the electric motor and the gearbox together form a drive unit, the operation of the electric motor usually causes individual components of the drive unit to become statically charged and thus brings about differences in potential between components that are not statically charged. In general, it is possible to bring about potential equalization between components having varying potentials by means of relatively complex design measures. In the seal according to the invention, this potential equalization is achieved in a very simple manner by means of the sealing ring itself, which is made of an electrically conductive material, the seal having a simple structure and being easy and cheap to produce.

FIGS. 1 to 4 each show one embodiment of a seal.

The seal comprises a supporting ring 1 and a sealing ring 2, the sealing ring 2 being fixed to the supporting ring 1.

The supporting ring 1 is L-shaped and comprises a radial leg 7 and an axial leg 8, which is completely surrounded by the sheath 5 in the peripheral direction 12. The sealing ring 2 comprises a dynamically loaded sealing lip 6, which is arranged on the side of the sealing ring 2 facing radially away from the sheath 5 in radial direction 4.

The sealing ring 2 consists of an electrically conductive polymer material (a PTFE material in the shown embodiments), the sheath 5 and the sealing lip 6 being formed so as to transition into one another as one piece. As a result, the sealing ring 2 is electrically conductive, from the sealing lip 6 to the sheath 5, in order to ensure electric potential equalization between a shaft 13 to be sealed and a housing 14, which surrounds the shaft 13 to be sealed on the outer periphery 3 at a radial spacing. As a result, electrostatic charge between the shaft 13 to be sealed and the housing 14 is prevented, as is voltage puncture, which could damage the machine elements 13, 14 to be sealed with respect to one another.

In the shown sealing arrangement, it is particularly advantageous that the sheath 5 of the sealing ring not only ensures the above-described potential equalization, but is also formed so as to be statically sealing. There is therefore no requirement for a separately produced static seal for sealing with respect to the housing 14.

Figure 1:
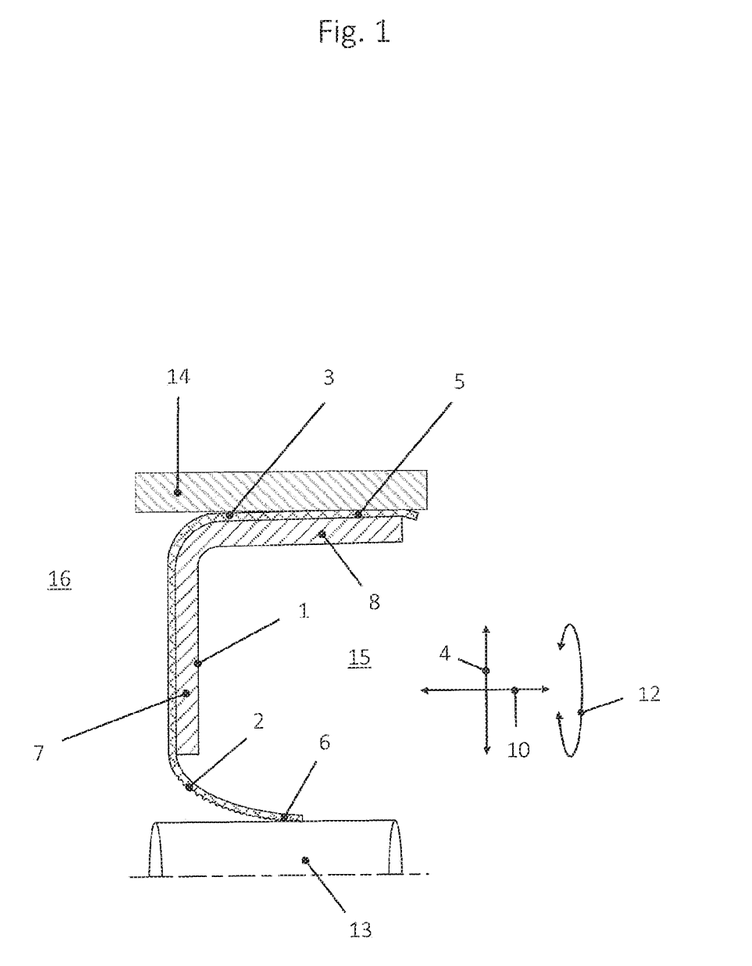
FIG. 1 shows a first embodiment, which has a particularly simple structure, the sealing lip of the sealing ring being formed as a main sealing lip for sealing a medium to be sealed in a chamber to be sealed.

FIG. 1 shows a first embodiment, which is particularly easy and cheap to produce. The seal consists of only two parts, specifically the supporting ring 1 and the sealing ring 2, the sealing ring 2 comprising the sheath 5 and the sealing lip 6, which are formed so as to transition into one another as one piece and are formed of the same material.

In the embodiment shown here, the sealing lip 6 is axially curved towards a chamber 15 to be sealed of the sealing arrangement.

Figure 2:
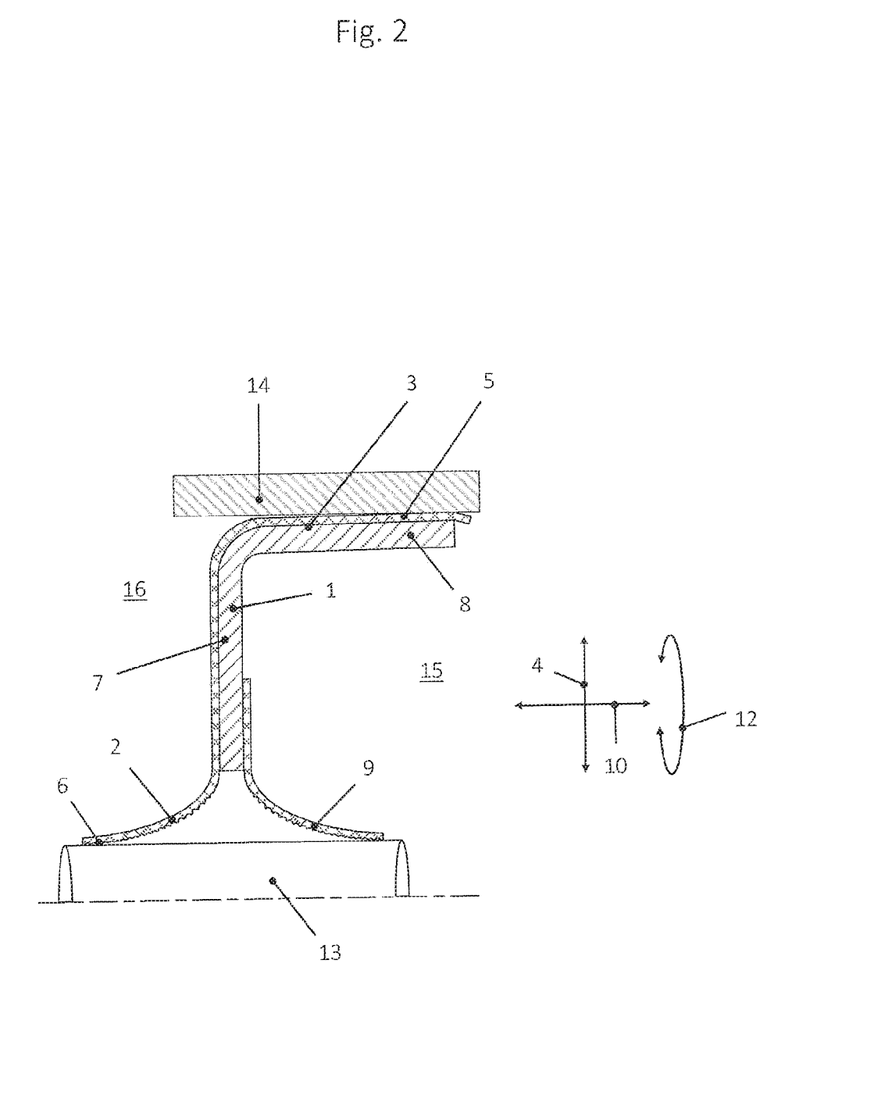
FIG. 2 shows a second embodiment, which is similar to the embodiment from FIG. 1, the dynamically loaded sealing lip being formed as a preliminary sealing lip, in relation to a further sealing lip, which is formed as a main sealing lip for sealing a medium to be sealed in a chamber to be sealed.

By contrast, in FIG. 2, the dynamically loaded sealing lip 6 is formed as a preliminary sealing lip and is axially curved towards the surroundings 16 of the sealing arrangement. In addition, in this embodiment, the further sealing lip 9 is provided, which is provided as a main sealing lip for sealing the medium to be sealed in the chamber 15 to be sealed. The further sealing lip 9 is arranged upstream of the dynamically loaded sealing lip 6 in the axial direction 10 in a functional series arrangement, as viewed from the chamber 15 to be sealed.

In FIGS. 1 and 2, the dynamically loaded sealing lip 6 is directly abuttingly fixed to the supporting ring 1. The further sealing lip 9 in FIG. 2 is also in direct abutting contact with the supporting ring 1.

Figure 3:
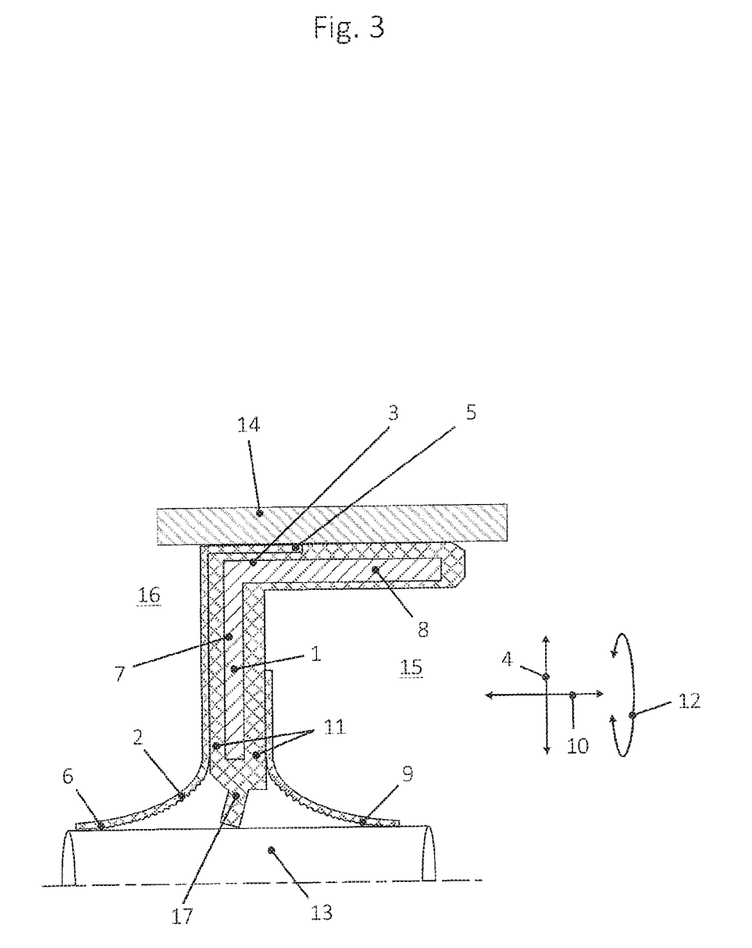
FIG. 3 shows a third embodiment, in which the sealing lips are each indirectly fixed to the supporting ring by means of an elastomer track.

FIG. 3 shows a third embodiment, which is similar to the embodiment from FIG. 2, the supporting ring 1 being completely surrounded by the elastomer track 11. The dynamically loaded sealing lip 6 and the further dynamically loaded sealing lip 9 are connected to the elastomer track 11 such that the sealing ring 2 is in indirect abutting contact with the supporting ring 1 by means of an elastomer track 11.

An elastomer sealing lip 17 which, between the dynamically loaded sealing lip 6 and the further dynamically loaded sealing lip 9 in the axial direction 10, sealingly surrounds the surface to be sealed of the shaft 13 to be sealed so as to be radially prestressed is arranged on the radial leg 7 on the radially inner periphery.

Figure 4:
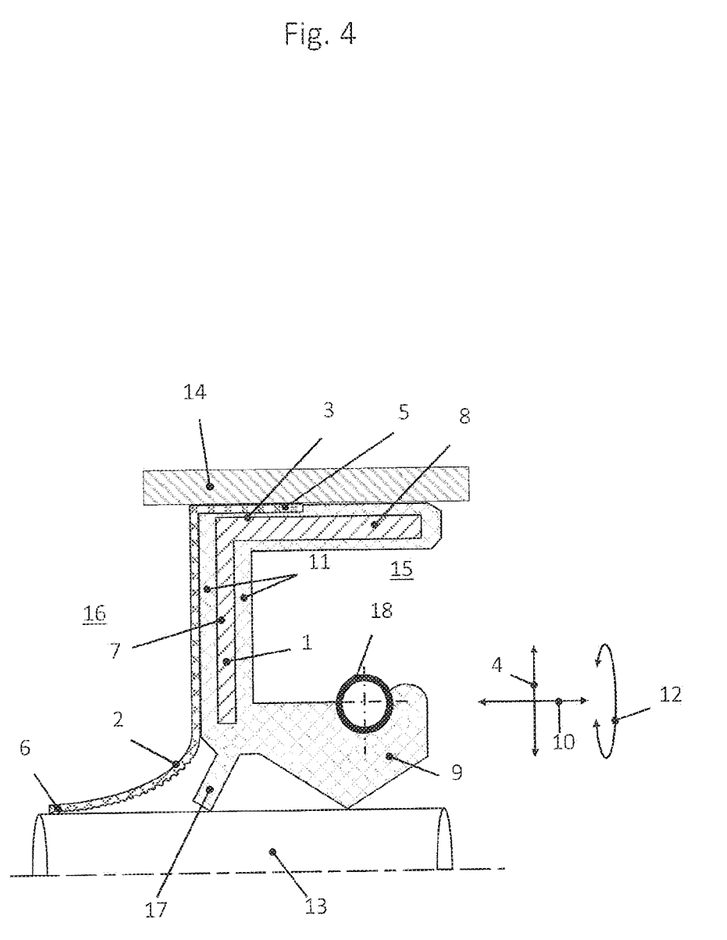
FIG. 4 shows a fourth embodiment, which is similar to the embodiment from FIG. 3, an elastomer sealing lip which is surrounded on the outer periphery by an annular spiral coiled spring being used as a further sealing lip.

FIG. 4 shows a fourth embodiment, which is similar to the embodiment from FIG. 3, a further dynamically loaded sealing lip 9 consisting of an elastomer material being used in place of the further dynamically loaded sealing lip 9 consisting of a polymer material. Said further sealing lip 9 is in the form of a conventional radial shaft sealing ring, said lip being sealingly pressed, by means of an annular spiral coiled spring 18, against the outer periphery 3 of the shaft 13 to be sealed.

Just as in FIG. 3, an elastomer sealing lip 17, which forms a preliminary seal for the further sealing lip 9 and is arranged axially upstream of said further sealing lip towards the surroundings 16, is arranged between the dynamically loaded sealing lip 6 and the further dynamically loaded sealing lip 9 in the axial direction 10.

In FIGS. 3 and 4, the above-described electric potential equalization is achieved by the dynamically loaded sealing lip 6, which electrically conductively connects the shaft 13 to be sealed to the housing.

Overall, it is a notable advantage that the dynamically loaded sealing lip 6 which brings about the electric potential equalization consists of a wear-resistant polymer material such that said sealing lip can be arranged not only in the chamber 15 to be sealed containing the medium to be sealed, as shown in FIG. 1, thereby being lubricated by the medium to be sealed. Said sealing lip may also be arranged in the surroundings 16, as shown in FIGS. 2 to 4, and therefore does not come into contact with the medium to be sealed in the chamber 15 to be sealed. On account of the advantageous polymer material that is used, lubrication by means of the medium to be sealed is not required.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A seal, comprising:
   a supporting ring; and
   at least one sealing ring, the at least one sealing ring having a sheath, the at least one sealing ring and the supporting ring being interconnected,
   wherein the supporting ring comprises an outer periphery and is, at least in part, surrounded on the outer periphery by the sheath of the at least one sealing ring in a radial direction, the at least one sealing ring comprising a first dynamically loaded sealing lip, which is arranged on a side of the at least one sealing ring facing radially away from the sheath, and a second dynamically loaded sealing lip arranged upstream of the first dynamically loaded sealing lip in an axial direction,
   wherein the at least one sealing ring is comprised of an electrically conductive polymer material,
   wherein the sheath and the first dynamically loaded sealing lip transition into one another as one piece,
   wherein the supporting ring is substantially L-shaped and has a radial leg and an axial leg which adjoins the radial leg externally in the radial direction,
   wherein the at least one sealing ring is in indirect abutting contact with the supporting ring by an elastomer track,
   wherein the elastomer track completely surrounds the axial leg, and
   wherein the elastomer track comprises an elastomer sealing lip disposed between the first dynamically loaded sealing lip and the second dynamically loaded sealing lip in the axial direction.

2. The seal according to claim 1, wherein the electrically conductive polymer material comprises a PTFE material.

3. The seal according to claim 1, wherein the sheath is configured so as to be statically sealing.

4. The seal according to claim 1, wherein the axial leg is completely surrounded by the sheath on the outer periphery.

5. The seal according to claim 1, wherein the sheath extends along the radial leg in the radial direction so as to transition into the first dynamically loaded sealing lip as one piece.

6. The seal according to claim 1, wherein the first dynamically loaded sealing lip is configured to seal a medium to be sealed in a chamber to be sealed.

7. The seal according to claim 1, wherein the second dynamically loaded sealing lip is configured to seal a medium to be sealed in a chamber to be sealed, the second dynamically loaded sealing lip being arranged with the first dynamically loaded sealing lip in a functional series arrangement.

8. The seal according to claim 7, wherein the second dynamically loaded sealing lip is comprised of a polymer or elastomer material.

9. The seal according to claim 1, wherein the supporting ring is comprised of a metal material.

10. A seal, comprising:
    a supporting ring; and
    at least one sealing ring, the at least one sealing ring having a sheath, the at least one sealing ring and the supporting ring being interconnected,
    wherein the supporting ring comprises an outer periphery and is, at least in part, surrounded on the outer periphery by the sheath of the at least one sealing ring in a radial direction, the at least one sealing ring comprising a first dynamically loaded sealing lip, which is arranged on a side of the at least one sealing ring facing radially away from the sheath, and a second dynamically loaded sealing lip arranged upstream of the first dynamically loaded sealing lip in an axial direction,
    wherein the at least one sealing ring is comprised of an electrically conductive polymer material,
    wherein the sheath and the first dynamically loaded sealing lip transition into one another as one piece,
    wherein the supporting ring is substantially L-shaped and has a radial leg and an axial leg which adjoins the radial leg externally in the radial direction,
    wherein the at least one sealing ring is in indirect abutting contact with the supporting ring by an elastomer track,
    wherein the elastomer track completely surrounds the axial leg,
    wherein the sheath and the first dynamically loaded sealing lip are comprised of the same material, and
    wherein the elastomer track comprises an elastomer sealing lip disposed between the first dynamically loaded sealing lip and the second dynamically loaded sealing lip in the axial direction.

11. A seal, comprising:
    a supporting ring; and
    at least one sealing ring, the at least one sealing ring having a sheath, the at least one sealing ring and the supporting ring being interconnected,
    wherein the supporting ring comprises an outer periphery and is, at least in part, surrounded on the outer periphery by the sheath of the at least one sealing ring in a radial direction, the at least one sealing ring comprising a first dynamically loaded sealing lip, which is arranged on a side of the at least one sealing ring facing radially away from the sheath, and a second dynamically loaded sealing lip arranged upstream of the first dynamically loaded sealing lip in an axial direction,
    wherein the at least one sealing ring is comprised of an electrically conductive polymer material,
    wherein the sheath and the first dynamically loaded sealing lip transition into one another as one piece, wherein the supporting ring is substantially L-shaped and has a radial leg and an axial leg which adjoins the radial leg externally in the radial direction, wherein the at least one sealing ring is in indirect abutting contact with the supporting ring by an elastomer track, wherein the elastomer track completely surrounds the axial leg, wherein the elastomer track completely surrounds the radial leg, and wherein the elastomer track comprises an elastomer sealing lip disposed between the first dynamically loaded sealing lip and the second dynamically loaded sealing lip in the axial direction.

12. The seal according to claim 1, wherein the outer periphery of the sheath comprises an outermost component of the seal.

13. The seal according to claim 10, wherein the outer periphery of the sheath comprises an outermost component of the seal.

14. The seal according to claim 11, wherein the outer periphery of the sheath comprises an outermost component of the seal.

* * * * *